United States Patent
Logan

(12) 
(10) Patent No.: US 6,631,271 B1
(45) Date of Patent: Oct. 7, 2003

(54) RULES BASED METHODS AND APPARATUS

(76) Inventor: James D. Logan, 81 Castle Hill Rd., Windham, NH (US) 03087

(*) Notice: Subject to any disclaimer, the term of this patent is extended or adjusted under 35 U.S.C. 154(b) by 379 days.

(21) Appl. No.: 09/651,542

(22) Filed: Aug. 29, 2000

(51) Int. Cl.[7] ............... H04Q 7/20; H04Q 3/02; G06F 3/00
(52) U.S. Cl. ............ 455/456; 455/41; 455/457; 345/963; 240/821.36; 709/310
(58) Field of Search ............... 455/41, 456, 39, 455/9, 457, 459; 375/219, 222; 345/963, 810, 841, 843, 864, 866, 845; 240/821.36, 825.49, 539; 701/200; 709/310, 332

(56) References Cited

U.S. PATENT DOCUMENTS

| | | | | |
|---|---|---|---|---|
| 4,217,588 A | * | 8/1980 | Freeny, Jr. | 342/458 |
| 4,881,179 A | * | 11/1989 | Vincent | 358/1.14 |
| 5,602,982 A | * | 2/1997 | Judd et al. | 345/709 |
| 5,623,404 A | * | 4/1997 | Collins et al. | 705/9 |
| 5,812,131 A | * | 9/1998 | Bertram | 345/798 |
| 5,881,377 A | * | 3/1999 | Giel et al. | 455/41 |
| 5,929,848 A | * | 7/1999 | Albukerk et al. | 345/700 |
| 6,088,593 A | * | 7/2000 | Dent | 455/41 |
| 6,324,211 B1 | * | 11/2001 | Ovard et al. | 375/219 |

* cited by examiner

*Primary Examiner*—Vivian Chin
*Assistant Examiner*—Kamran Afshar
(74) *Attorney, Agent, or Firm*—Charles G. Call

(57) ABSTRACT

A rules-based system for monitoring the movement and relative location of a plurality of electronic devices and performing specified actions, such as issuing notification messages and actuating alarms, when the conditions specified in tone or more rules are satisfied. The rules are accepted from a user. Each rule includes a condition part and an action part. The condition part includes at least one positional condition which defines the relative position of at least two electronic devices. The action part defines one or more functions to be performed when the corresponding condition part is satisfied. Each electronic device incorporates radio signaling means which preferably takes the form of a Bluetooth chip. The signaling device on at least selected ones of the electronic devices performs inquiry operations to identify other electronic devices which are with range of the inquiring device. The positional data derived from these inquiries is passed to a rules processor which initiates defined actions when one or more of the rules are satisfied. A web server may be used to accept rules definitions, receive posted positional data from connected devices, and initiate the actions specified by the satisfied rules. Alternatively, user devices may be programmed to perform one or more of these functions. The system may be advantageously used to issue notification messages to prevent needed electronic devices from being misplaced or forgotten.

9 Claims, 3 Drawing Sheets

RULES BASED METHODS AND APPARATUS

FIELD OF THE INVENTION

This invention relates to methods and apparatus for generating alarm or notification signals in response to the changing relative locations of electronic devices.

BACKGROUND OF THE INVENTION

People are growing increasingly dependent on portable electronic devices such a cellular phones, personal computers, digital assistants, car locking controls, electronic watches, calculators, digital cameras, and the like. Because these devices are usually small, they are easily misplaced or forgotten, and because access to these devices is often essential, it is desirable to provide methods and apparatus for insuring that these devices are available when they are needed.

The functionality of both portable and fixed electronic devices is expected to be dramatically extended and improved by the advent of improved short range wireless connectivity provided by Bluetooth™ radio transmitters which are being incorporated into new electronic devices. The Bluetooth radio is built into a small microchip and operates within a globally available frequency band. The Bluetooth specification defines two power levels: a lower power mode with a range of about 10 meters for covering a personal area within a room, and a higher power level with a range of about 100 meters covering a larger area, such as a home or office. Software controls and identity coding built into each microchip ensure that only those units preset by their owners can communicate, and provide a mechanism for identifying other devices that are within range. As discussed below, this new technology may also be used to insure that needed devices are available when they are needed, and to provide related functions.

SUMMARY OF THE INVENTION

In a principle aspect, the present invention takes the form of a rules-based system for monitoring the movement and relative location of a plurality of electronic devices and for performing specified actions, such as issuing notification messages and actuating alarms, when the conditions specified in one or more or the defined rules are satisfied. The rules are specified by and accepted from a user. Each rule includes a condition part and an action part. The condition part includes at least one positional condition which defines the relative position of at least two electronic devices. The action part defines one or more functions to be performed when the corresponding condition part is satisfied. Each electronic device incorporates radio signaling means which preferably takes the form of a Bluetooth chip. The signaling device on at least selected ones of the electronic devices performs inquiry operations to identify other electronic devices which are with range of the inquiring device. The positional data derived from these inquiries is passed to a rules processor which initiates defined actions when one or more of the rules are satisfied. A web server may be used to accept rules definitions, receive posted positional data from connected devices, and initiate the actions specified by the satisfied rules. Alternatively, user devices may be programmed to perform one or more of these functions. The system may be advantageously used to issue notification messages to prevent needed electronic devices from being misplaced or forgotten.

DETAILED DESCRIPTION

Figure 1:
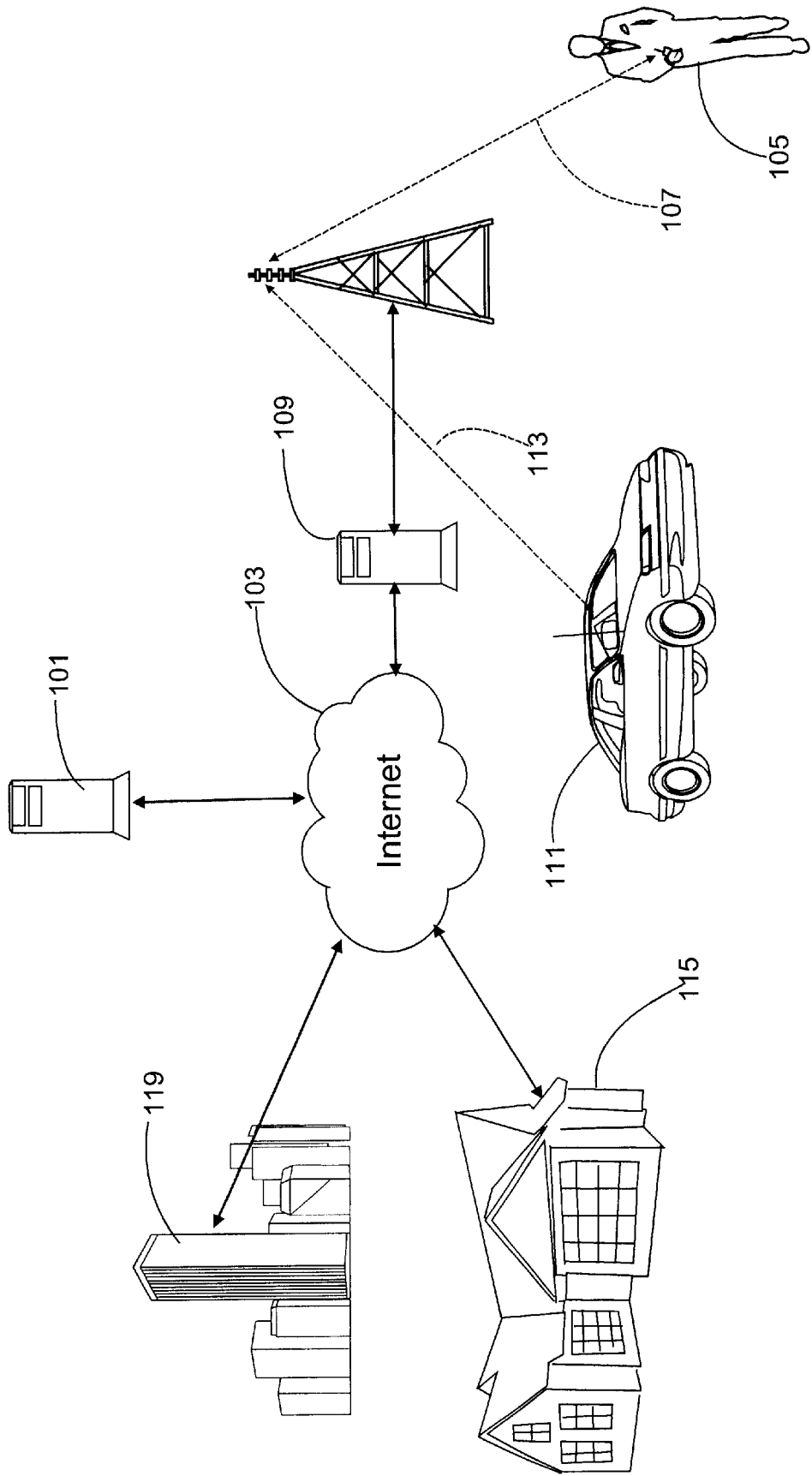
FIG. 1 is a schematic view illustrating a network of electronic devices which utilize the present invention.

As contemplated by the present invention, a the relative locations of a network of electronic devices, each including a Bluetooth chip, are monitored to generate notification signals in accordance with user-defined rules. An illustrative example of such a network is shown in FIG. 1. Supervisory functions for the system are executed on a server 101 which is connected via the Internet 103 to a plurality of different fixed and portable electronic devices which employ Bluetooth chips to provide connectivity.

For example, the user seen at 105 uses a hand held cellular phone which is connected to the Internet 103 using a Wireless Application Protocol (WAP) radio link 107 and a WAP gateway server 109. Similar, the user's automobile 111 employs a second WAP link 113 and the WAP gateway 109 to connect to the Internet. Additional electronic devices, such as personal computers, at the user's home 115 and office 119 are also connected to the Internet via conventional means, including dialup and fixed connections to Internet Service Providers (ISPs).

Each of the foregoing devices are thus provided with Internet connections and each is further provided with a Bluetooth chip which enables that device to communicate over short ranges to still further devices (not shown in FIG. 1). For example, the user 115 may carry with them additional devices, such as a laptop computer or a personal device assistant (PDA), an electronic wristwatch, a remote control for an automobile door lock, a digital camera, or an electronic calculator. Each of these devices may be equipped with a Bluetooth chip which can communicate with other devices, including the user's cellular phone which includes a Bluetooth chip that enables it to also operate as a short range intercom device and as a portable phone when it is the vicinity of a base station at the user's home 115 or office 119.

The user's automobile 111 is also equipped with a cellular phone system capable of establishing data communications via the WAP gateway 109 and the Internet 103 to provide information, entertainment, and communications services to the occupants. The automobile may be further provided with a navigation system using the Global Positioning System (GPS), a diagnostic system capable of generating, displaying and transmitting status information about the automobile, The automobile's car locking system may employ a Bluetooth enabled transceiver to remotely control door and truck locks, lights, and anti-theft alarms.

At the user's home 115 and at his or her office 199, Bluetooth enabled devices may be integrated into a variety of fixed systems, including thermostats, appliances, entertainment systems, lighting controls, security systems, and office equipment. Although the Bluetooth chips in these devices may be primarily intended for different functions, they can play a useful role in the position monitoring and notification system contemplated by the present invention, a described below.

The invention may be advantageously applied to business as well as consumer applications. For instance, an engineer who customarily takes instruments and tools into the field may use the system to prevent these devices from being misplaced or forgotten. By using the user-defined rules for montoring the relative and absolute positions of various devices, in combination with user-defined actions which should be performed when associated conditions are satisfied, the system can be tailored to the needs of the particular user and the specific devices which that user owns and operates.

Bluetooth Functions

As described in *Profiles, Specification Volume 2, Specification of the Bluetooth System*, V1.0B, Dec. 1, 1999, under the Generic Access Profile, two devices involved in a Bluetooth communication can take the roles specified by the generic notation of the A-party (the paging device in case of link establishment, or initiator in case of another procedure on an established link) or the B-party (paged device or acceptor). The A-party is the one that, for a given procedure, initiates the establishment of the physical link or initiates a transaction on an existing link.

The Bluetooth access profile establishes the procedures between two devices related to discovery and connecting (link and connection establishment) for the case where none of the two devices has any link established as well as the case where (at least) one device has a link established (possibly to a third device) before starting the described procedure. The Bluetooth user should, in principle be able to connect a Bluetooth device to any other Bluetooth device. Even if the two connected devices don't share any common application, it should be possible for the user to find this out using basic Bluetooth capabilities.

Each Bluetooth device is specified by a unique 48-bit (12 hexadecimal digit) Bluetooth Device Address (BD_ADDR) and by a "user friendly". Bluetooth Device Name which can be up to 248 bytes long, although external devices are not expected to be able to handle or display more than 40 characters. Still further, each device is assigned a Bluetooth passkey (Bluetooth PIN) which is used to authenticate two Bluetooth devices (that have not previously exchanged link keys) to each other and create a trusted relationship between them. The PIN may be entered through a user interface device and may also be stored in the device; e.g. in the case of a device without sufficient capability for entering and displaying digits.

Bluetooth devices are further specified by a Class of device parameter received during the device discovery procedure and indicating the type of device and which types of service that are supported. The information within the Class of Device parameter is referred to as 'Bluetooth Device Class' (i.e. the major and minor device class fields) and 'Bluetooth Service Type' (i.e. the service class field). The terms for the defined Bluetooth Device Types and Bluetooth Service Types are defined in [11]. The Class of device is a bit field and, at the user interface level, the information in the Class of device is implementation specific.

Bluetooth devices are capable of performing an inquiry function to determine the identity and Device Class of other "discoverable" Bluetooth devices which are in range. With respect to inquiry, a Bluetooth device shall be either in non-discoverable mode or in a discoverable mode; that is, the device shall be in one, and only one, discoverability mode at a time. The two discoverable modes defined here are called limited discoverable mode and general discoverable mode. When a Bluetooth device is in non-discoverable mode it does not respond to inquiry. A Bluetooth device is said to be made discoverable, or set into a discoverable mode, when it is in limited discoverable mode or in general discoverable mode. Even when a Bluetooth device is made discoverable it may be unable to respond to inquiry due to other baseband activity. A Bluetooth device that does not respond to inquiry for any of these two reasons is called a silent device.

Bluetooth devices are capable of perform different types of inquiries called a (1) general inquiry, (2) limited inquiry, (3) name inquiry, (4) device discovery, and (5) bonding. The purpose of the general inquiry procedure is to provide the initiator with the Bluetooth device address, clock, Class of Device and used page scan mode of general discoverable devices (i.e. devices that are in range with regard to the initiator and are set to scan for inquiry messages with the General Inquiry Access Code) Also device in limited discoverable mode will be discovered using general inquiry. The general inquiry is intended to be used by devices that need to discover devices that are made discoverable continuously or for no specific condition.

The purpose of the limited inquiry procedure is to provide the initiator with the Bluetooth device address, clock, Class of Device and used page scan mode of limited discoverable devices. The latter devices are devices that are in range with regard to the initiator, and may be set to scan for inquiry messages with the Limited Inquiry Access Code, in addition to scanning for inquiry messages with the General Inquiry Access Code. The limited inquiry is intended for use by devices that need to discover devices that are made discoverable only for a limited period of time, during temporary conditions or for a specific event.

The purpose of name discovery is to provide the initiator with the Bluetooth Device Name of connectable devices (i.e. devices in range that will respond to paging). A Name request is the procedure for retrieving the Bluetooth Device Name from a connectable Bluetooth device. It is not necessary to perform the full link establishment procedure) in order to just to get the name of another device. In the name request procedure, the initiator will use the Device Access. Code of the remote device as retrieved immediately beforehand—normally through an inquiry procedure.

The purpose of device discovery is to provide the initiator with the Bluetooth Address, Address, clock, Class of Device, used page scan mode and Bluetooth device name of discoverable devices. During the device discovery procedure, first an inquiry (either general or limited) is performed, and then name discovery is done towards some or all of the devices that responded to the inquiry.

Figure 2:
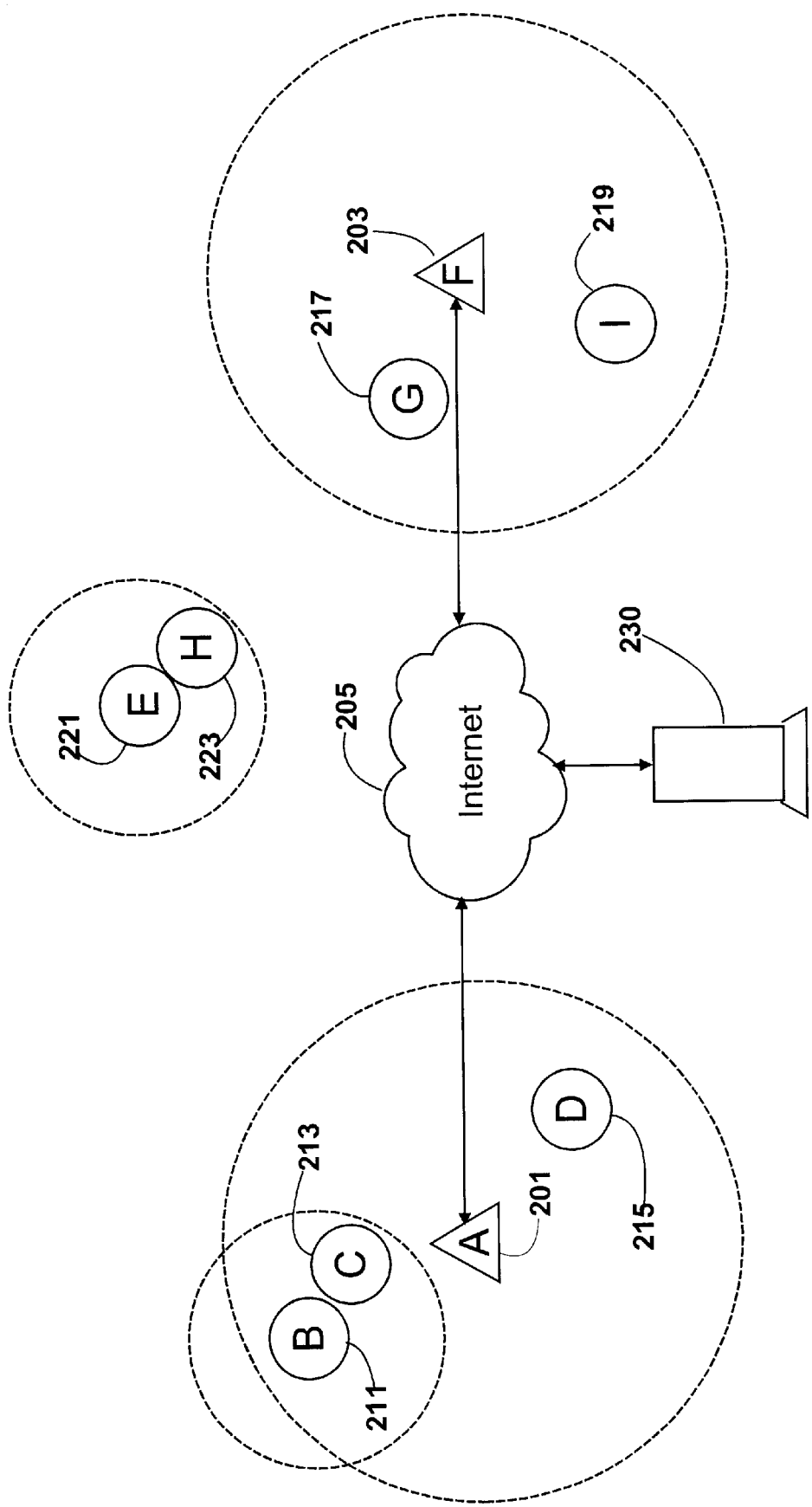
FIG. 2 illustrates the topology of a group of electronic devices as defined by ability of at least selected ones of the devices to identify other devices within its limited signaling range.

The built-in ability of a Bluetooth device to detect the presence and identity of other Bluetooth devices which are within its range may be used to provide location information which is then used, as described below, to generate useful notification messages to the user. An illustrative topology is shown by way of example in FIG. 2. As there shown, two fixed Bluetooth devices illustrated by the triangles A and F at 201 and 203 are each linked to the Internet as seen at 205, and both can operate in a long range mode. Thus, the device illustrated by the triangle F at 201 can discover the presence of and communicate with the Bluetooth devices illustrate by the circles B, C and D at 211, 213 and 215 respectively. The device indicated by the circle B operating in short range mode can detect the nearby device C, but the device D is out of range for the device B. The devices indicated by the circle G at 217 and by the circle I at 219 are both within the range of the D device F at 203. The device indicated by the circle E at 221 is out of the range of both the devices A and F, but is near to and can discover the presence and identity of device H at 223.

Those Bluetooth device which are programmable (e.g. personal computers, PDAs, and the like) may be readily programmed to detect and report the position of nearby devices. Thus, the device A may be programmed to detect the fact that devices B, C and D are within its range, that devices E, G, H and I are outside its range, and that device C is also within the range of device B but that device D is not.

A server seen at 230 is connected to the Internet, and hence to devices A and F. The server 230 receives HTTP messages from the remote devices A and F containing the position information obtained by transmitting Bluetooth inquiry messages from devices A and F, and by gathering position information obtained from satellite Bluetooth devices, such as the device B.

The server 230 executes a supervisory program which records the position information contained in received messages to establish state information at predetermined times. By comparing the state information at different times, transition events can be detected. Thus, if device B moves outside the range of device A, the time at which that movement occurred can be determined.

Other Range and Position Detection Systems

Other systems can be used to identify when particular objects are within a predetermined range of other objects. For example, identification tags which can be detected at short range are used in electronic article surveillance systems to prevent shoplifting and theft, warehousing and inventory control systems, article processing and inspection systems, and the like. Such systems are available fron Unisen of Boca Raton, Fla.; Detectag of Aurora, Ontario, Canada; and Sensormatic of Boca Raton, Fla. Using these range-sensing, tagging mechanisms in combination with the user-defined rules contemplated by the invention, the user can tag articles which should be, or should not be, in particular places at particular times, as defined by the condition part of user-specified rules.

In addition to, or as an alternative to, the range finding abilities of a Bluetooth device, an article surveillance system, or the equivalent, an object whose position is to be tracked may incorporate a Global Positioning System (GPS) receiver for determining the absolute position in latitude and longitude for that device. For example, the GPS 25 series receivers available from Garmin Industries provide position information—accurate to within 5 meters, velocity information accurate to 0.1 m/s RMS, are small in size (46.5 mm×69.9 mm×11.4 mm), and consume little power (115 mA typical @5.0 VDC). For details on the Global Positioning System and GPS receivers, see *Understanding GPS: Principles and Applications* by Elliott D. Kaplan (Editor), Artech House; ISBN 0890067937 (1996).

In addition, Mobile Positioning Systems (MPS) which are incorporated into cellular phone systems provide a mechanism for continuously or periodically updating location information for cell phones. MPS technology is similar to the satellite-based Global Positioning System (GPS) but offers the additional capability of determining location inside buildings, parking garages and other shielded areas such as inside a pocket or briefcase that are inaccessible to GPS systems. MPS Mobile Positioning Systems for GSM cellular phones are offered by Erickson and Cellpoint, Inc.

When a GPS or MPS device is used to determine absolute position, the user defined rules which determine when predetermined actions are performed may include absolute position requirements. For example, the GPS receiver in an automobile navigation system may be used to add a condition to the condition part of a rule which states "If my automobile is more than 2 miles from my house, and . . . "

The range and absolute position data from the network of electronic devices may be advantageously stored in a relational database and manipulated using standard query services and procedures. These query services process location data which may specify the geographic "point" position of fixed objects (without absolute position sensing means) and movable object which use GPS or MPS mechanisms to determine current position. When precise data is unavailable, objects positions may be approximated by specifying defined regions which contain the objects. Preferably, this location data is stored in a standard format, such as that used by the locator feature in Oracle8i interMedia, a component of the Oracle 8i™ database available from Oracle Corporation, Redwood Shores, Calif. This locator feature, and Oracle Spatial, and its extensions used with the Oracle8i Enterprise Edition product, provides an integrated set of functions and procedures that enables spatial data to be stored, accessed, and analyzed quickly and efficiently in an Oracle8i database. Oracle Spatial provides a SQL schema and functions that facilitate the storage, retrieval, update, and query of collections of spatial features in an Oracle8i database, and includes the following components:

a. A schema that prescribes the storage, syntax, and semantics of supported geometric data types;

b. A spatial indexing mechanism;

c. A set of operators and functions for performing area-of-interest and spatial join queries; and c. Administrative utilities.

For more detailed information, see *"Oracle8i interMedia Audio, Image, and Video User's Guide and Reference."* Release 8.1.,5 Oracle Corporation (Oracle Part No. A67299-01), 1999, and *Oracle Spatial User's Guide and Reference*, Release 8.1.6, (Oracle Part No. A77132-01), 1997, 1999.

Rules Definitions

The supervisory program executing on the server 230 can further accept rules definition from a user. For example, using a conventional forms based HTML/CGI interface, the user may specify the conditions which are to be satisfied before certain actions may be taken.

By way of example, the user may define rules with the goal of making sure a user does not forget to take certain devices with their person. These devices or things that people commonly carry with them and that have some value include a Palm Pilot, cell phone, wallet, keys, pocketbook, briefcase, and portable computer. Each of these items would be equipped with a Bluetooth chip. In addition, Blue Tooth chips could be integrated into a small device (here called a "badge") whose prime function is to indicate position and which can be could placed on or near stationary devices, such as the Palm docking station, or the cell phone recharger, with which Bluetooth devices or things bearing other Bluetooth badges could link to at times.

The "web of rules" of rules defined by the user could detect and inform the user of a rich variety of events. For instance, if the user's electronic watch was in proximity to her car during the day on Monday through Friday, then the user's cell phone and briefcase should also be in proximity to the car. That is, the cell phone and briefcase should be with the user when she is traveling, and the location of the watch signifies the location of the user. Thus, the user can define a rule which states that, if the watch is within the range of the car during business hours on Monday through Friday, and further if either the cell phone or the briefcase are not in the vicinity of the car at that time, the user should be alerted in of a variety of user-defined ways as described later.

As a further example, the user could establish the rule that if the user left the house (as determined by being out of range of the particular fixed device), and a house security system indicated that the doors were not locked, and if no other user was still present in the house, the departing user would be alerted.

The action taken when a give rule is satisfied can take numerous forms. In the foregoing example, the user can be notified by a actuating a suitable alarm on a device known to be with the user (e.g., by causing her watch it sound an audible alarm or to vibrate.). Other actions can be taken when a condition is satisfied. For example, when the user enters the car for the first time when the state information indicates a different person had formerly used the car the cars seats could be automatically adjusted for the new driver. As another example, when the system indicated that the user had left her house or her office at particular times of day, the telephone system could be programmed to automatically start call forwarding calls to a different location, or to automatically select a different greeting message that callers would hear when the calls were unanswered.

The supervisory program executing on the server (seen at 10 in FIG. 1 and at 230 in FIG. 2) could also currently report the position of articles. Thus, if the user had neglected bring her car keys, she could consult a display on her cell phone provided from the server using via the PDAs WAP interface, which might inform her that her keys (and its Bluetooth car lock control) were within range of the television set (with its Bluetooth remote control) her bedroom.

Figure 3:
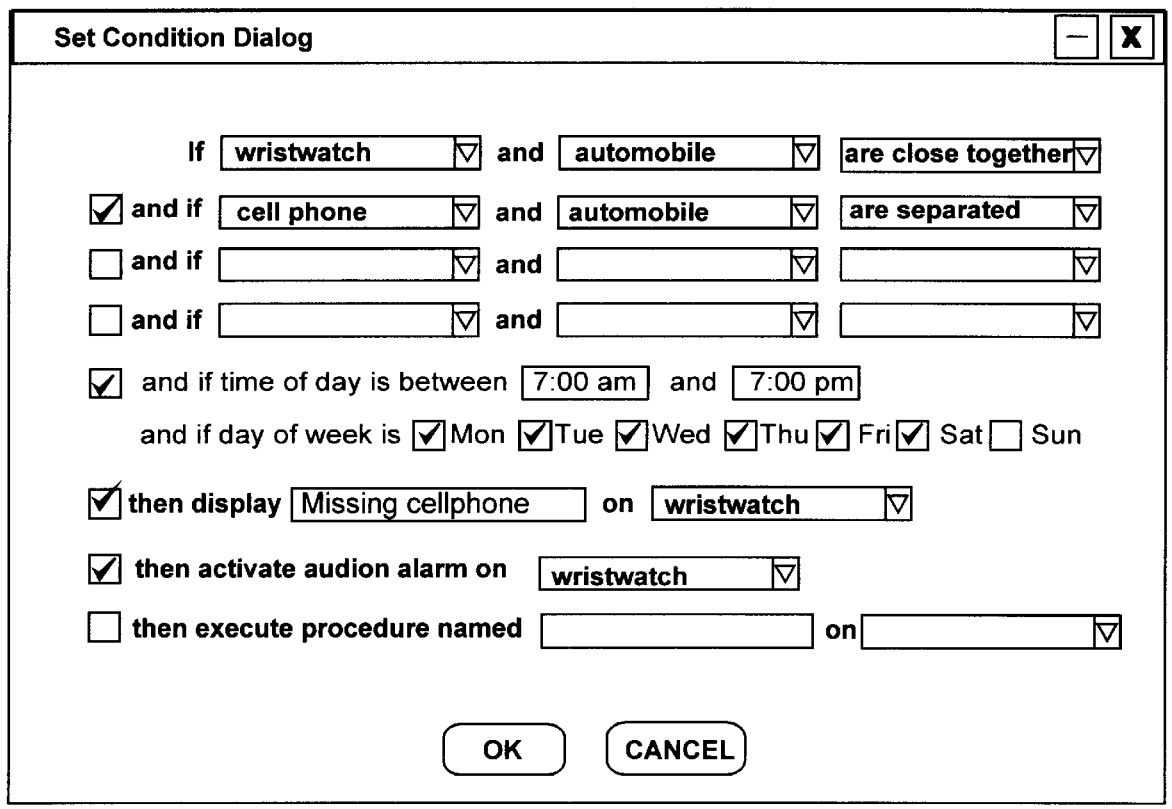
FIG. 3 depicts the screen layout of a user interface dialog box used to define one or more of the rules used to control the operation of the system.

The rules can be defined by the user using an HTML forms-based interface on a Web server, or by running a program for accepting rules on one of the user's electronic devices, such as a personal computer. An example rule definition form is shown in FIG. 3. Each rule consists of up to for positional conditions, each of which specifies two devices and each of which states whether that particular positional condition is satisfied when those two devices (1) are close together; (2) a not close together, (3) have moved together, or (4) have moved apart. The first two possibilities can be determined by either of the Bluetooth chips issuing an inquiry to identify those electronic devices which are within its range, and the second two possibilities can be determined by comparing the current state of one of the devices with its prior state to determine which, if any, other devices have moved with.range or have move out of range between states. In addition, the dialog form seen in FIG. 3 allows the user to state the time of day and the days of the week when the conditional test is to be performed.

As seen in FIG. 3, the rule further defines an action part which specifies functions to be performed when all of the conditions in the condition part of the rule are satisfied. The user can enter the text of a message to be.displayed and specify the electronic device which is to display the message; the user can sound an audible alarm on a specified device; and/or the user can designated a named procedure to be performed on a programmable device.

It is to be understood that the embodiment of the invention that has been described is merely one illustrative application of the principles of the present invention. Numerous modifications may be made to the methods and apparatus described without departing from the true spirit and scope of the invention.

What is claimed is:

1. The method for performing one or more specified-functions in response to the changing positions of a plurality of objects, said method comprising, in combination, the steps of:

programming a first computer t o accept one or more rules from a user, each of said rules containing a condition part and an action part, said condition part defining at least one position condition to be satisfied by the position of specified ones of said objects and each action part defining at least one specified action to be performed when said condition part is satisfied, receiving position data providing location information for said specified ones of said objects, processing said positional data in accordance with said rules, and performing the functions defined in the action part of each of said rules whose condition part is satisfied by said position data.

2. The method of claim 1 wherein at least some of said objects include electronic signaling means for identifying other objects which are within the limited signaling range of said signaling means, and further include means for transmitting positional data which identifies said other objects.

3. The method of claim 2 wherein said signaling means comprises a first integrated circuit radio transceiver chip including means for performing an inquiry function to determine the presence of another integrated circuit radio transceiver chip within the limited signal range of said first transceiver chip.

4. The method of claim 1 wherein said first computer is a Web server computer connected to accept said one or more rules from a user via the Internet.

5. The method of claim 1 wherein said first computer is a portable electronic device adapted to communicate via a wireless link with other of said electronic devices.

6. The method of claim 1 including the steps of determining the current absolute geographic location of a moveable electronic device and wherein the position part of at least one of said rules defines an absolute location condition to be satisfied by the current location of said movable device.

7. The method of claim 6 wherein the step of determining the current absolute geographic location of a moveable electronic device is performed by a Global Positioning System receiver associated with said moveable electronic device.

8. The method of claim 6 wherein said moveable electronic device is a cellular phone and wherein said step of determining the current absolute geographic location of said cellular phone is performed by the cellular phone Mobile Positioning System.

9. The method of claim 1 including the step of determining the relative position of two of said electronic devices and wherein the position part of at least one of said rules defines a relative location condition to be satisfied by said two electronic devices.

* * * * *